J. R. MOFFATT.
MULTIPLE NEEDLE GUARD.
APPLICATION FILED DEC. 15, 1915.
1,276,393.
Patented Aug. 20, 1918.
5 SHEETS—SHEET 2.
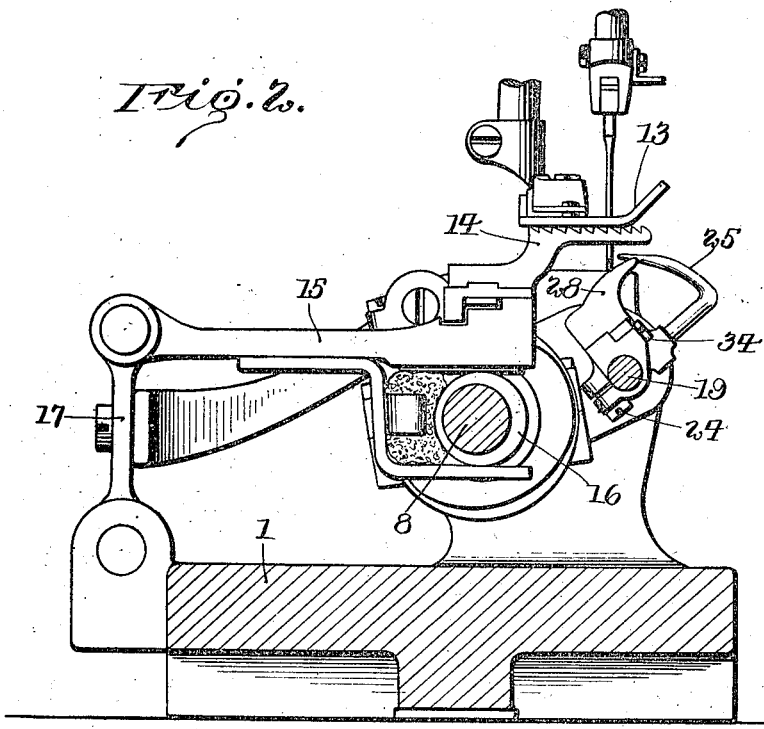
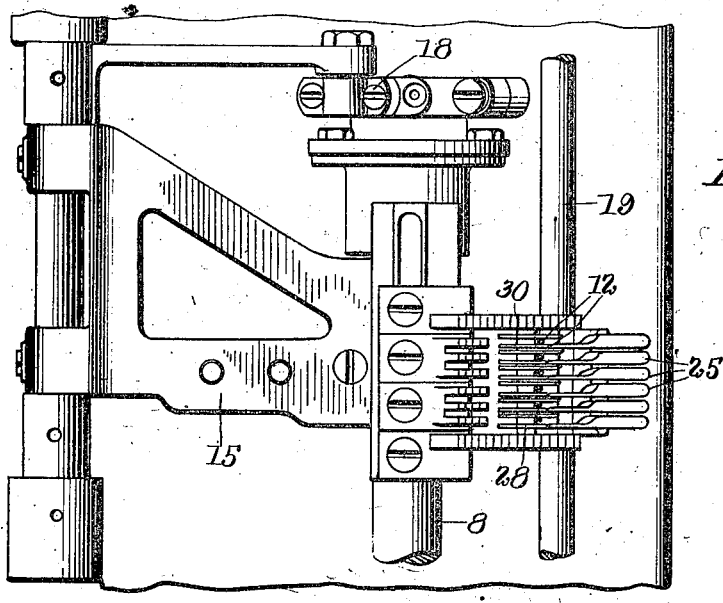

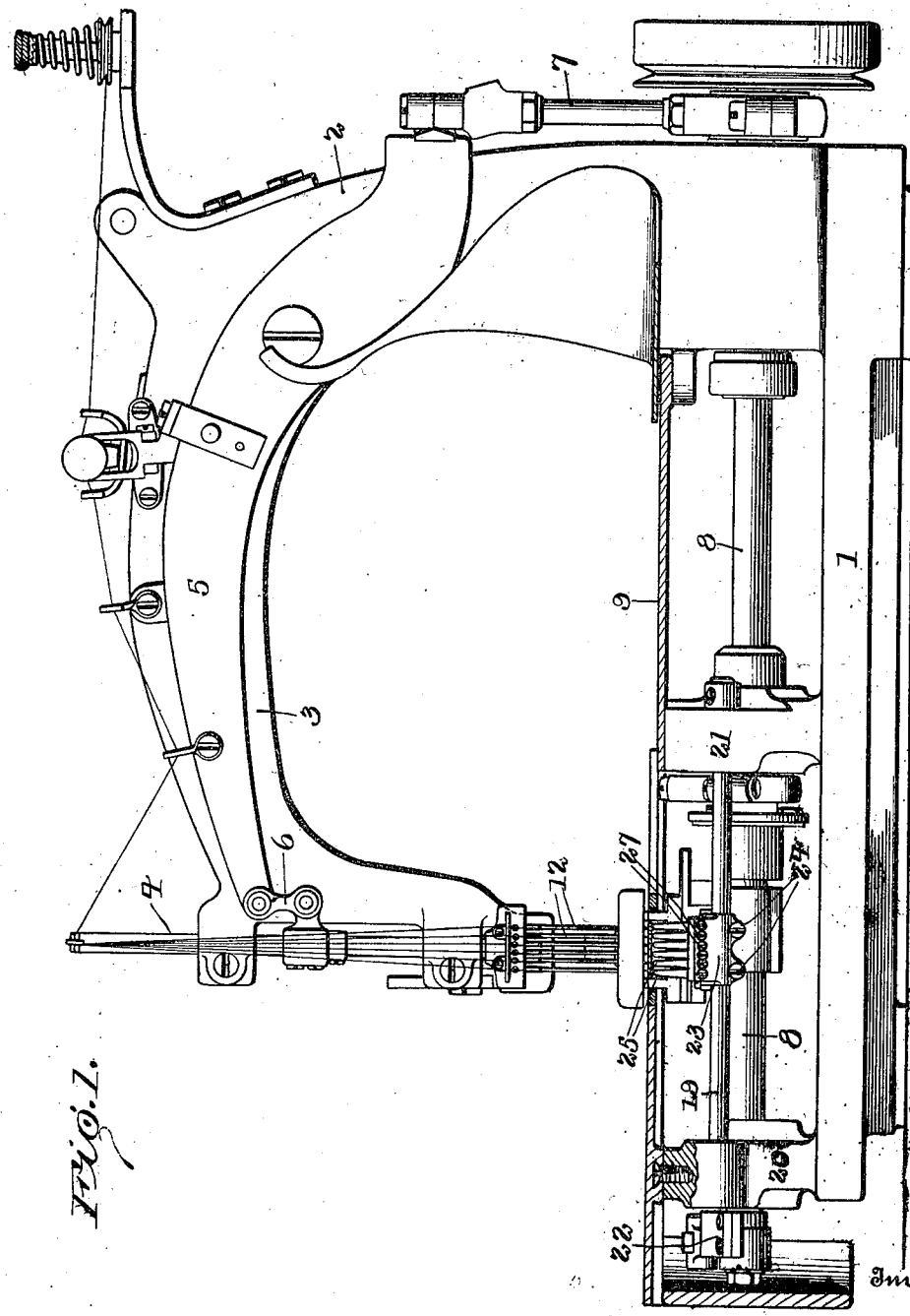

J. R. MOFFATT.
MULTIPLE NEEDLE GUARD.
APPLICATION FILED DEC. 15, 1915.
1,276,393.
Patented Aug. 20, 1918.
5 SHEETS—SHEET 3.
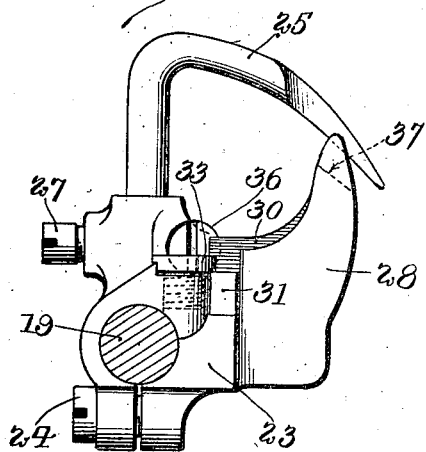
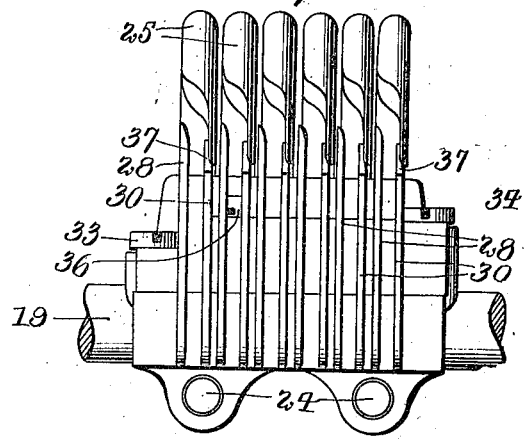
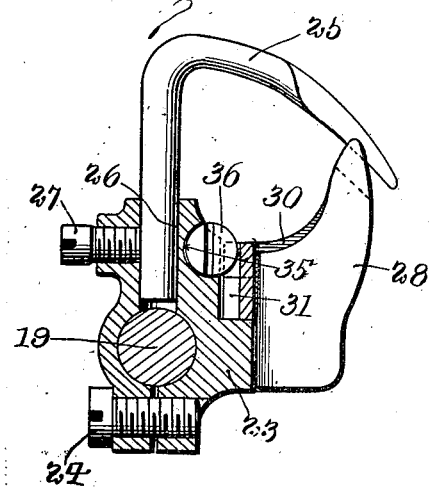
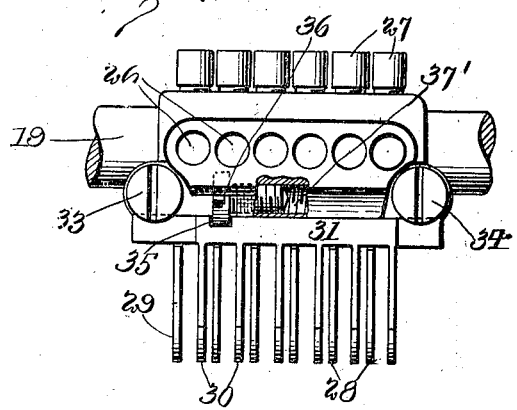
Witness
Grace P. Brereton
Rosina T. Finotti
Inventor
James R. Moffatt
By Sturtevant & Mason
Attorneys

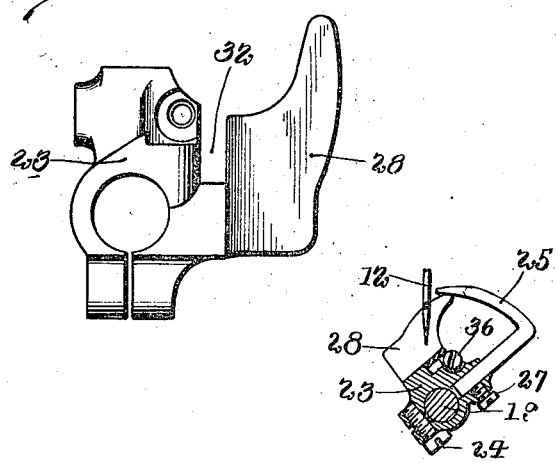
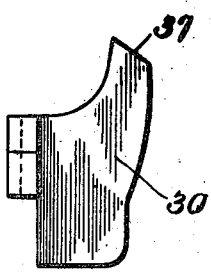
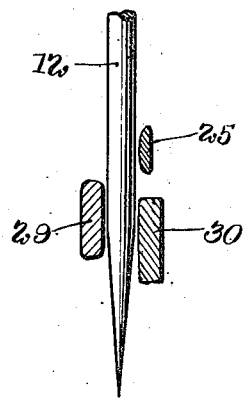
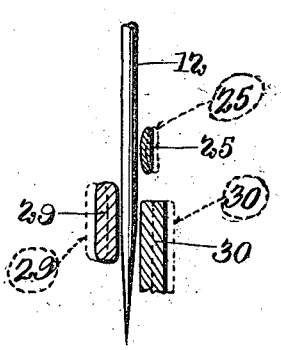

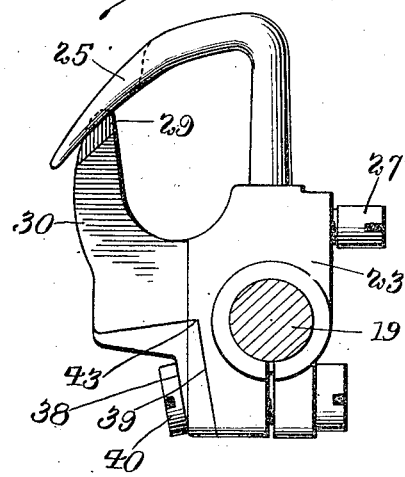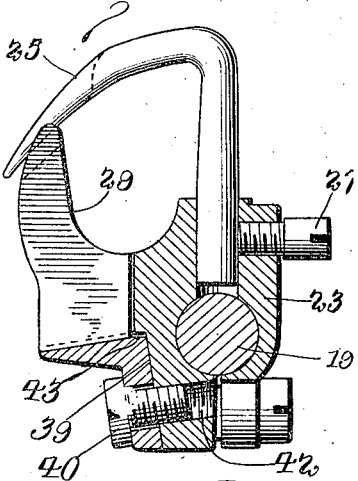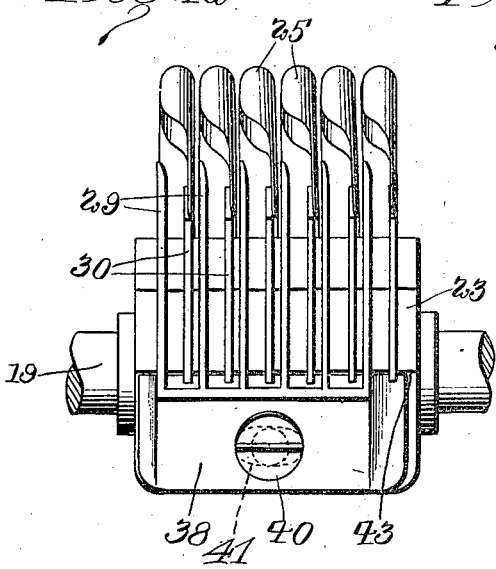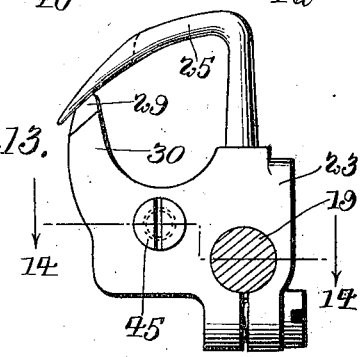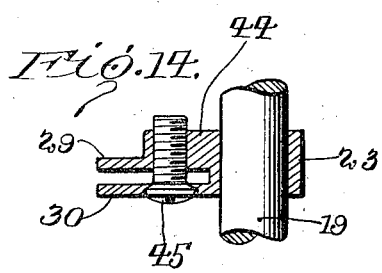

UNITED STATES PATENT OFFICE.

JAMES R. MOFFATT, OF CHICAGO, ILLINOIS, ASSIGNOR TO UNION SPECIAL MACHINE COMPANY, OF CHICAGO, ILLINOIS, A CORPORATION OF ILLINOIS.

MULTIPLE-NEEDLE GUARD.

1,276,393.

Specification of Letters Patent.

Patented Aug. 20, 1918.

Application filed December 15, 1915. Serial No. 66,963.

*To all whom it may concern:*

Be it known that I, JAMES R. MOFFATT, a citizen of the United States, residing at Chicago, in the county of Cook, State of Illinois, have invented certain new and useful Improvements in Multiple-Needle Guards, of which the following is a description, reference being had to the accompanying drawing and to the figures of reference marked thereon.

The invention relates to new and useful improvements in needle guards for sewing machines. Multiple guards for needles have been used prior to this invention; said multiple guards consisting of a guarding section on the same side of the needle as the looper which prevents the needle from being deflected into the path of the looper and a guarding section on the opposite side of the needle which prevents the needle from being deflected so that the looper will skip the needle loop. Multiple guards of the above character have been used more particularly in connection with non-thread carrying loopers and also in multiple needle machines.

An object of the present invention is to provide a multiple needle guard of the above character which may be adjusted to properly position the sections of the needle guard relative to the needle.

A further object of the invention is to provide a needle guard of the above character which may be adjusted for different sized needles.

A still further object of the invention is to provide means for simultaneously adjusting similar sections of the needle guards used in the multiple needle machine.

These and other objects will in part be obvious and will in part be more fully described.

In the drawings:—

Figure 1 is a view, partly in front elevation and partly in section, showing a machine having my improvements embodied therein;

Fig. 2 is a transverse sectional view at one side of the feed bar, the work support and overhanging arm being omitted;

Fig. 3 is a plan view of the parts shown in Fig. 2;

Fig. 4 is an enlarged end view of the looper carrier showing the needle guards and the loopers mounted thereon;

Fig. 5 is a front view of the same;

Fig. 6 is a sectional view through the looper carrier showing the manner of mounting the looper and the adjusting screw for shifting the needle guard;

Fig. 7 is a view, partly in plan and partly in section, of the looper carrier showing the loopers removed and an adjusting screw for shifting the needle guard;

Fig. 8 is an end view of the looper carrier showing the shiftable needle guards removed;

Fig. 9 is an end view of the needle guards;

Fig. 10 is an end view of the looper carrier showing a modified means for adjusting the needle guards on the looper carrier;

Fig. 11 is a sectional view through the looper carrier shown in Fig. 10;

Fig. 12 is a front view of the looper carrier shown in Fig. 10;

Fig. 13 is an end view of the looper carrier showing a further modified form of means for adjusting the needle guards;

Fig. 14 is a sectional view on the line 14—14 of Fig. 13;

Fig. 15 is a diagrammatic view, showing the relative positions of the looper and the needle guard with one size needle;

Fig. 16 is a similar view with a smaller needle and showing the looper and needle guard adjusted to coöperate therewith; and Fig. 17 is a view showing the position of the needle, the looper just before the point thereof passes the needle guard on the opposite side of the needle from the looper.

In a single chain stitch machine wherein the looper is a non-thread carrying looper said looper usually moves back and forth in a single plane entering the needle loop and retaining said needle loop until the needle has risen and again descended so that it may enter its own loop held by the looper. In machines of this character it is essential that the looper point should move close to the shank of the needle when entering the needle loop in order to avoid skipping of needle thread loops and also that the needle should move close to the looper in order that it may with certainty enter its own loop held by the looper. Prior to this invention, it has been customary to provide a multiple needle guard for the needle in which one section of the needle guard is located on the same side of the needle as the looper while the other section is on the opposite side of the needle. These sections of the needle guard prevent the needle from being deflected out of its normal path and from proper coöperation with the looper.

The present invention consists generally in a multiple needle guard of the above character wherein the sections of the needle guard are capable of relative adjustment so that the needle guard is adapted to properly coöperate with needles of varying sizes. The invention, from certain other aspects, however, is particularly directed to a multiple needle machine wherein there are a plurality of multiple needle guards. These needle guards are usually mounted on the looper carrier and the invention consists further in mounting one set of similar sections of the multiple needle guards so that they may be simultaneously adjusted relative to the looper carrier and relative to the other sections of the needle guards.

The invention also further consists in providing means for shifting the adjustable sections of the needle guards as well as for permitting their adjustment.

Referring more in detail to the drawings, I have shown my invention as applied to a sewing machine having a bed plate 1 carrying a standard 2 which terminates in an overhanging arm 3. A needle bar 4 reciprocates in the overhanging arm. A needle lever 5 is connected to the needle bar by a link 6 and this needle lever is oscillated by an eccentric strap 7 coöperating with an eccentric on the main shaft 8. A work support 9 is carried by the bed plate. As shown in Fig. 1 of the drawings the needle bar is provided with a plurality of needles 12. The material to be stitched is held on the work support by a presser foot 13. The material is fed across the work support by a feed dog 14 carried by a feed bar 15 which is raised and lowered by an eccentric 16 on the main shaft 8. This feed bar 15 is pivoted to a feed rocker 17 which is oscillated by an eccentric strap 18 coöperating with an eccentric on the main shaft 8.

A looper supporting shaft 19 is mounted in brackets 20 and 21 carried by the supporting bed 1 and this looper shaft is oscillated by a train of mechanism indicated at 22 in Fig. 1, from the main shaft 8. Mounted on the looper shaft is a looper carrier 23. Said carrier may be adjusted endwise of the looper shaft and is held in adjusted position by clamping screws 24 When a plurality of needles such as indicated at 12, are used, there is a looper 25 for each needle. These loopers are mounted in suitable sockets 26—26 formed in the looper carrier 23 and the loopers are held therein by set screws 27. As the main shaft rotates, the looper shaft will be oscillated, the needles will be reciprocated and the loopers carried by the looper shaft will respectively enter the needle loops, then remain forward while the needles are raised and again descend into the needle loops held by the respective loopers. This operation of the needles and loopers is of the well known character.

Coöperating with each needle beneath the work support is a multiple needle guard 28. Each needle guard is composed of two sections, one indicated at 29 and the other at 30. Each section 29 is fixedly secured to the looper carrier 23. As a matter of fact, as shown in the drawings, these sections 29 are integral with the looper carrier. Each of the sections 30 is mounted on a supporting plate 31. The looper carrier is formed with a recess 32, see Fig. 8 in which this plate 31 fits and said plate may be adjusted endwise within certain limits. The screws 33 and 34 are threaded into the looper carrier and the heads of these screws overlie the plate 31, see Figs. 4 and 7. By turning down said screws the plate 31 may be held in fixed position on the looper carrier. Said plate 31 is formed with a notch 35. A screw 36 is threaded into an opening 37 in the looper carrier and the head of this screw engages the notch 35. After the screws 33 and 34 have been loosened, a turning of the screw 36 in one direction will move the plate 31 to the right and the turning of this screw 36 in the opposite direction will move the plate to the left.

The sections 30 of the multiple needle guard are located directly underneath the respective loopers 25, as shown in Fig. 5. Each section 30 has the upper end thereof cut away at 37, see Figs. 9 and 10 and also the dotted lines shown in Figs. 4, 6 and 11. The sections 29 of the needle guards are located on the opposite sides of their respective needles from the loopers. This forms a space between the sections 29 and 30 into which the needles move after they pass the loopers. The sections 29 prevent the needles from being deflected away from the loopers and thus prevent the skipping of needle thread loops. The sections 30 prevent the needles from being deflected into the path of the looper, see Fig. 17.

It is sometimes desirable to change the size of the needle, that is, to change from a needle having one diameter to a needle having a different diameter.

In Fig. 15 of the drawings I have shown a needle and its relation to the looper and the sections 29 and 30 of the needle guard.

In Fig. 16 of the drawings, I have shown the needle changed to a smaller size, in which the diameter of the needle is less, and have indicated in dotted lines the adjustment of the looper and sections of the needle guard to bring them into proper coöperative relation to this smaller size needle.

After the needles are inserted first the looper carrier 23 is released from its supporting shaft 19 by loosening the screws 24 and the carrier is moved on the shaft until the section 29 of each needle guard is brought into the full line position shown in Fig. 16. In this figure the dotted line indicates the previous position of this section 29 of the needle guard. Each looper is released from its holding screw 27 and slightly turned in its supporting socket to bring the point of the looper to the new position indicated in full lines at 25 in Fig. 16. The dotted line position in this figure indicates the previous position of the looper. The screws 33 and 34 are now loosened which releases the plate 31 carrying the sections 30 of the needle guards. The screw 36 is rotated so as to shift this plate and carry the sections 30 of the needle guards to the full line position in Fig. 16. The dotted lines indicate the old position of the section 30.

From the above it will be apparent that I have been able to position each looper in a multiple needle machine so as to properly coöperate with a smaller size needle and also change the position of the sections of the needle guard so as to properly guide the needle and prevent the same from being deflected either toward or away from the normal needle path.

In Figs. 10 to 12 inclusive, of the drawings, I have shown a slightly modified form of the invention. In these figures the sections 29 of the needle guards are adjusted instead of the sections 30. Each section 29 is carried by a supporting plate 38. The shank of the looper carrier 23 is formed with a flat face 39 and this plate 38 fits against the said flat face. A screw 40 extends through an elongated slot 41 indicated in dotted lines in Fig. 12 and is threaded into an opening 42 in the looper carrier. The upper edge of the plate extends underneath a ledge 43 on the looper carrier and this ledge tends to guide the plate in its lateral movements. When the screw 40 is released the plate 38 may be shifted laterally and the sections 29 given a new position relative to the looper and also relative to the needle.

In the present form of the invention, when a smaller needle is placed in the machine the looper carrier is shifted toward the needle and again clamped to the looper supporting shaft. This movement of the looper carrier brings the looper point in proper coöperation with the smaller needle and brings the section 30 of the needle guard into proper relation with the needle. The plate 38 is then shifted in the opposite direction which brings the section 29 of the needle guard into proper relation with the needle.

In Figs. 13 and 14 I have shown a still further modified form of the invention. In these views I have shown a single looper and a single multiple needle guard therefor. The needle guard is made integral with the looper carrier which is indicated at 23. The section 29 has a relatively thick shank portion 44, while the section 30 is of substantially the same thickness throughout. A screw 45 extends through the section 30 and is threaded into the shank 44 carrying the section 29. By turning this screw the section 30 may be moved toward or from the section 29, the metal yielding to permit this adjustment of the parts. This multiple needle guard may be adjusted to properly coöperate with a needle of any diameter, in the manner described in connection with Figs. 1 to 9.

It is obvious that minor changes in the details of construction may be made without departing from the spirit of the invention, as set forth in the appended claims.

Having thus described my invention, what I claim as new and desire to secure by Letters Patent, is;—

1. A needle guard for sewing machines, including a support, spaced needle guarding sections carried by the support, and means for adjusting one of said sections toward and from the other and for holding the same in fixed position relative thereto.

2. The combination of a plurality of needles and a multiple needle guard for the needles including spaced needle guarding sections disposed on opposite sides of each needle, means whereby the needle guarding sections at the same side of each needle may be shifted bodily relative to the needle guarding sections at the other side of each needle and means for clamping said sections in an adjusted position.

3. The combination of a needle, a looper carrier, a looper mounted in said carrier and coöperating with said needle, a multiple needle guard for the needle mounted on said looper carrier and including spaced sections, said needle guard having one section thereof on the same side of the needle as the looper and the other section on the opposite side of the needle, and means for adjusting said sections relative to each other.

4. The combination of a needle, a looper carrier, a looper mounted in said carrier and coöperating with said needle, a multiple needle guard for the needle mounted on said looper carrier and including spaced sections, said needle guard having one section thereof on the same side of the needle as the looper and the other section on the opposite side of the needle, and means whereby one of said sections may be shifted bodily on the looper carrier relative to the looper.

5. A sewing machine including in combination, a plurality of spaced needles, a looper carrier, a plurality of loopers mounted thereon one for each needle, a multiple needle guard for each needle including separate sets of needle-guarding sections, each needle-guarding set being disposed so that each section thereof is on the same side of its respective needle as the looper coöperating with said needle and each section of the other needle-guarding set is on the opposite side of its respective needle, and means whereby one set of sections of the needle guard may be simultaneously adjusted toward and from the sections of the other set.

6. A sewing machine including in combination, a plurality of spaced needles, a looper carrier, a plurality of loopers mounted thereon one for each needle, a multiple needle guard for each needle including separate sets of needle-guarding sections, each needle-guarding set being disposed so that each section thereof is on the same side of its respective needle as the looper coöperating with said needle and each section of the other needle-guarding set is on the opposite side of its respective needle, means whereby one set of sections of the needle guard may be simultaneously adjusted toward and from the sections of the other set, a supporting plate for the adjustable sections, a screw for shifting said supporting plate, and means for clamping said supporting plate in an adjusting position.

In testimony whereof I affix my signature in the presence of two witnesses.

JAMES R. MOFFATT.

Witnesses:
S. GEORGE TATE,
A. F. BREDSHALL.